United States Patent
Ringe et al.

(10) Patent No.: US 10,452,575 B1
(45) Date of Patent: Oct. 22, 2019

(54) SYSTEM, METHOD AND APPARATUS FOR ORDERING LOGIC

(71) Applicant: Arm Limited, Cambridge (GB)

(72) Inventors: Tushar P. Ringe, Austin, TX (US); Jamshed Jalal, Austin, TX (US); Mark David Werkheiser, Austin, TX (US); Glenn Allan Canto, Cambridge (GB); Ashok Kumar Tummala, Cedar Park, TX (US); Devi Sravanthi Yalamarthy, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/055,211

(22) Filed: Aug. 6, 2018

(51) Int. Cl.
*G06F 3/00* (2006.01)
*G06F 13/16* (2006.01)
*G06F 3/06* (2006.01)

(52) U.S. Cl.
CPC ........ *G06F 13/1668* (2013.01); *G06F 3/0613* (2013.01); *G06F 3/0659* (2013.01); *G06F 3/0673* (2013.01)

(58) Field of Classification Search
CPC .. G06F 13/1626; G06F 13/4022; G06F 21/70; G06F 21/85; G06F 13/1668; G06F 3/0613; G06F 3/0659; G06F 3/6073
See application file for complete search history.

(56) References Cited

U.S. PATENT DOCUMENTS

| 10,095,631 | B2 * | 10/2018 | Meyer | G06F 12/1018 |
| 2013/0111181 | A1 * | 5/2013 | Kothamasu | G06F 12/0284 |
| | | | | 711/202 |

OTHER PUBLICATIONS

AMBA 5 CHI Architecture Specification; 2018; Arm Limited; All Pages (Year: 2018).*

* cited by examiner

*Primary Examiner* — Farley Abad
*Assistant Examiner* — Richard B Franklin
(74) *Attorney, Agent, or Firm* — Leveque IP Law, P.C.

(57) ABSTRACT

A system, apparatus and method for ordering a sequence of processing transactions for a plurality of peripheral units. The sequence of transactions is accomplished by mapping an incoming address to a target endpoint. The ordering of the transactions is agnostic to the type of endpoint being targeted and only considers an identifier of the transaction for ordering purposes.

19 Claims, 4 Drawing Sheets

SYSTEM, METHOD AND APPARATUS FOR ORDERING LOGIC

BACKGROUND

In many communications systems, including interconnect systems, it may be desirable for an I/O (input/output) node to vary ordering, or sequence, requirements based on a targeted endpoint.

As computing systems are advancing, the components therein are becoming more complex. As a result, the interconnect architecture to couple and communicate between the components such as peripheral nodes and I/O nodes is also increasing in complexity thereby ensuring bandwidth and other functional requirements are met for optimal component operation.

For example, in a single-chip microcomputer having serial I/O communication logic, it is desirable to minimize the number of unnecessary interruptions of the on-board microprocessor or CPU function.

BRIEF DESCRIPTION OF THE DRAWINGS

The accompanying drawings provide visual representations, which will be used to more fully describe various representative embodiments and can be used by those skilled in the art to better understand the representative embodiments disclosed and their inherent advantages. In these drawings, like reference numerals identify corresponding elements.

DETAILED DESCRIPTION

While this disclosure is susceptible of embodiment in many different forms, there is shown in the drawings and will herein be described in detail specific embodiments, with the understanding that the present disclosure is to be considered as an example of the principles and not intended to limit the disclosures to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprise", "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Reference throughout this disclosure to "one embodiment", "certain embodiments", "an embodiment" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, operates or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the embodiments described herein.

The following terms may be used in this description of various embodiments.

Alias/Aliasing: a situation or process in which a data location in a memory or electronic storage medium can be accessed through different symbolic names in the program.

Agnostic: computing techniques relating to hardware or software that can be used with many different types of platforms or systems.

ARM® AMBA®: ARM AMBA (Advanced Microcontroller Bus Architecture), protocols that are an open standard, on-chip interconnect specification for the connection and management of functional blocks in a SoC (Silicon on Chip).

AXI Interface: Advanced e(X)tensible Interface (AXI). AXI is an interface developed by ARM®.

AXID: Advanced e(X)tensible Interface (AXI) Identification. AXI is an interface developed by ARM® for the ARM® AMBA microcontroller bus and is currently used by many companies such as Xilinx® incorporated.

C, C++, C#: a high-level programming language that was developed in the mid-1970s. It was originally used for writing Unix programs, but is now used to write applications for nearly every available platform. C++ is a programming language that was built off the C language. The syntax of C++ is nearly identical to C, but it has object-oriented features, which allow the programmer to create objects within the code. C# is a general object-oriented programming (OOP) language for networking and Web development. C# is specified as a common language infrastructure (CLI) language.

CHI™: Coherent Hub Interface. ARM® named the 16 core architecture with CoreLink cache coherent network and dual memory controllers as AMBA 5 Coherent Hub Interface. AMBA 5 CHI supports non-blocking coherent data transfers between many processors using distributed level 3 caches. In most systems, coherence with the I/O is accomplished through software, but with CHI it is all handled directly in hardware making the solution more reliable, faster and more power frugal than a software solution.

Channel: used to convey an information signal, for example a digital bit stream, from one or several senders (or transmitters) to one or several receivers. A channel has a certain capacity for transmitting information, often measured by its bandwidth in Hz or its data rate in bits per second. Communication channels typically use two types of media: cable (twisted-pair wire, cable, and fiber-optic cable) and broadcast (microwave, satellite, radio, and infrared). Cable or wire line media use physical wires of cables to transmit data and information.

Different address transactions: transactions that are not sequence specific and the process order may be altered.

End point: a type of communication network node. An endpoint may be a peripheral with memory-mapped I/O space, such as UART or GPIO that follows device memory ordering rules where all transactions to a given peripheral are kept in order. A physical memory, such as RAM or FLASH which follows normal memory ordering rules in which transactions to a given address (typically cache line size) are typically kept in order.

Flowchart: a type of diagram that represents an algorithm, workflow or process. The flowchart shows operations as boxes of various kinds, and their order.

Generate: to produce, create or derive from one or more operations or actions.

Hash: a hash function takes a group of characters, called a key, and maps it to a value of a certain length, called a hash value or hash. The hash value is representative of the original string of characters, but is normally smaller than the original.

Home-Node: node operators typically have a specific type of node. Typically, such a specific type of node has two Wi-Fi radios and two antennas for communication to other mesh nodes on both the 2.4 and 5 Gigahertz frequencies. Home-Nodes also typically have one wired network port for connecting to an existing internet connection, two wired network ports to connect to other devices and two wired network ports for connecting extender nodes.

HN-I SAM: Home-Node System Address Map.

Interface: either a hardware connection or a user interface. An interface can also be used as a verb, describing how two devices connect to each other. A hardware interface is used to connect two or more electronic devices together.

In-Flight: data or a transaction that is additional data or an additional transaction that is already stored in an old table and in a new table in the process of migration from the old table to the new table. Data/transaction in motion as opposed to data/transaction at rest.

I/O: input/output, the transfer of data between a processor and a peripheral device in a data processing system. I/O devices may include keyboards, displays, pointing devices, etc. that can be coupled either directly or through intervening I/O controllers.

Module: a component or part of a program or device that can contain hardware or software, or a combination of hardware and software. In a module that includes software, the software may contain one or more routines, or subroutines. One or more modules can make up a program and/or device.

Network Interface Controller (NIC): a controller, such as a network interface card. An NIC is a component that provides networking capabilities for a computer. It may enable a wired connection (such as Ethernet) or a wireless connection (such as Wi-Fi) to a local area network (LAN).

Peripheral: a computer device, such as a keyboard or printer, which is not part of the essential computer (i.e., the memory and microprocessor). These auxiliary devices are typically intended to be connected to the computer.

POS: point of serialization. A POS is used to convert a parallel signal made up of one or more bytes into a serial signal that transmits one bit after the other.

Porter® R2: ARM® research and development project related to hardware and architecture.

Protocol: a set of rules or procedures for transmitting data between electronic devices, such as computers. In order for computers to exchange information or data, there is a preexisting agreement as to how the information or data will be structured and how each device will send and receive information or data. Without a protocol, a transmitting computer, for example, could be sending its data in 8-bit packets while the receiving computer might expect the data in 16-bit packets.

Protocol bridge: a device that connects two networks, such as local-area networks (LANs), or two segments of the same LAN that use the same protocol, such as Ethernet or Token-Ring.

Range: a set or place in order or position.

Region: a type of memory management in which each allocated object is assigned to an area. A region, also called a zone, arena, area or memory context, is a collection of allocated objects that can be efficiently de-allocated all at once. Like stack allocation, regions facilitate allocation and de-allocation of memory with low overhead.

SAM: System Address Map. A memory mapping system that is user-programmable.

Similar address transactions: transactions that are sequence specific and are desired to have the process order maintained.

Source code: any collection of code, possibly with comments, written using human readable programming language, usually as plain text. The source code of a program is specially designed to facilitate the work of computer programmers, who specify the actions to be performed by a computer mostly by writing source code. The source code is often transformed by an assembler or compiler, into binary machine code understood by the computer. The machine code might then be stored for execution at a later time. Alternatively, source code may be interpreted and thus immediately executed.

Transaction: a sequence of information exchange and related work (such as database updating) that is treated as a unit for the purposes of satisfying a request and for ensuring database integrity. For a transaction to be completed and database changes to made permanent, a transaction has to be completed in its entirety.

Virtualization: to create a virtual version of a device or resource, such as a server, storage device, network, or operating system.

In an interconnect such as Porter®, an I/O Home-Node (HN-I) which contains POS (point of serialization) needs to cater to varying ordering, or sequence, requirements based on whether transactions are aiming for, or targeting, a peripheral endpoint or for a memory, RAM (Random Access Memory) endpoint. The target address may be provided at cache granularity.

Embodiments described herein reduce the complexity of such Home-Node by making the associated ordering logic, or sequence, agnostic of multiple ordering models by deploying a technique, such as an AXID virtualization technique, to control ordering or sequencing. This enhances design considerations thereby reducing time to market while improving PPA metrics for interconnect. By reducing unnecessary interrupts of the CPU (Central Processing Unit) the efficiency of the microprocessor and the throughput of the CPU are increased.

In an interconnect, a Home-Node (HN-I) for I/O (input/output) subsystem needs to support various ordering, or sequencing, models based on the type of endpoint being targeted. The endpoint, as defined above, refers to a peripheral with memory-mapped I/O space, such as UART or GPIO, which follows device memory ordering rules in which transactions to a given peripheral are kept in order, or sequence. The endpoint may also be a physical memory, such as RAM or FLASH which follows normal memory ordering rules where all transaction to a given address (typically cache line size) are kept in order.

In many instances, some nodes are designed to deal with two ordering models (device mode vs. normal mode) this complex interaction between the two modes makes node design complicated. Embodiments described herein enable Home-Nodes to be designed in such a way that ordering, or sequencing, of the transactions are done based on an incoming identifier, such as an AXI identifier (hereinafter, "AXID" or "AXID identifier"), and the ordering unit is agnostic of the type of endpoints it is communicating with. This ordering of transactions simplifies Home-Node design enabling reduced time to market while improving PPA (performance power area) metrics for the product.

Figure 1:
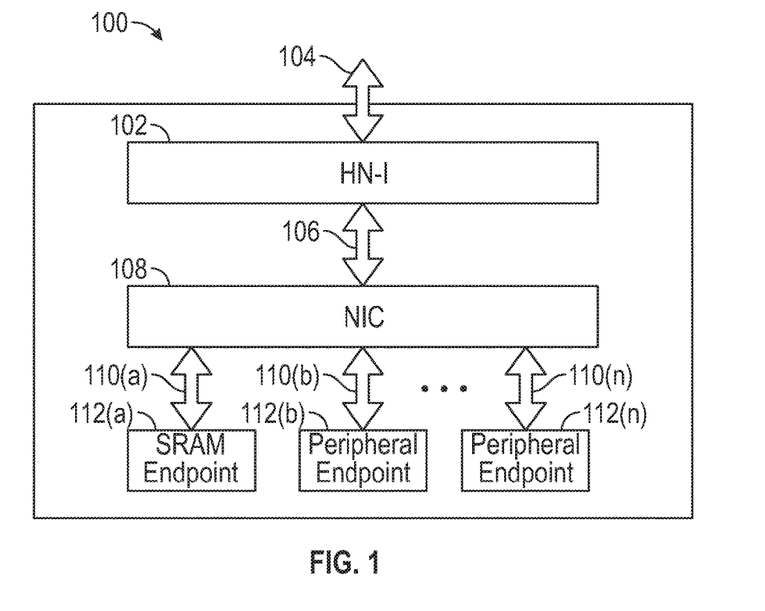
FIG. 1 illustrates an example block diagram of an I/O (input/output) subsystem that may be utilized in a communications system, in accordance with various representative embodiments.

FIG. 1 illustrates an example block diagram 100 of an I/O (input/output) subsystem that may be utilized in a communications system, in accordance with various representative embodiments. As shown in FIG. 1, I/O subsystem 100 includes an interface 104 in bi-directional communication with HN-I node, or module, 102. HN-I module 102 is in bi-directional communication with NIC module 108, via interface 106. NIC module 108 is in bi-directional communication with a plurality of endpoints, or endpoint modules, or endpoint devices, 112(a) . . . (n) (where "n" is any suitable number that comports with an I/O system), via associated bus 110(a) . . . (n) (where "n" is any suitable number that comports with an I/O system). Each of these elements is described in more detail herein.

Interface 104 may be either a hardware connection, or hardware interface, software connection or a user interface. A hardware interface is used to connect two or more electronic devices together. Interface 104 may be, for example, a Coherent Hub Interface (CHI Interface). The CHI interface is an interface that ARM® named for the 16 core architecture with CoreLink cache coherent network and dual memory controllers as AMBA 5 Coherent Hub Interface. AMBA 5 CHI supports non-blocking coherent data transfers between many processors using distributed level 3 caches. In most systems, coherence with the I/O is accomplished through software, but with CHI it is all handled directly in hardware.

HN-I module 102 is used as a mapping module (e.g., HN-I SAM) that accesses an incoming address and maps the incoming address to target endpoint. A target endpoint is typically an endpoint that is mapped to as a destination endpoint and a region type. The HN-I module, or mapping module, 102 has access to a plurality of address regions in a predetermined range and a plurality of endpoint types in the predetermined range, that are stored previously, or prior, or a priori. The prior, or a priori, storage may be in an electronic storage medium that can be local or remote, at a memory or storage location that can be accessed such that the data may be retrieved and utilized by a processor. HN-I module 102 provides a point of serialization (POS) of requests from nodes, or modules, such as endpoints 112 (generally).

Interface 106 may be, for example, an Advanced e(X) tensible Interface (AXI). The AXI is an interface developed by ARM® for the ARM® AMBA microcontroller bus and is currently used by many companies such as Xilinx® incorporated. The interface 106 provides a communication path between HN-I module 102 and NIC 108. The interface 106 can facilitate the mapping functionality when used in conjunction with HN-I module 102. The AXI interface 106 may be used to determine a sequence of transactions and destinations based on an identifier, such as an AXI identifier (AXI ID, or AXID), such as read/write transactions, which are independent of the type of endpoint, or endpoint module, 112 and address of the HN-I module (mapping module) 102.

The interface 106, such as an AXI Interface, can also be used to generate an identifier, such as an AXI identifier (AXID). The AXI Interface 106 can access, from the mapping module (HN-I SAM) 102, range information and a type of target endpoint (RAM or peripheral) 112. The AXID generation includes accessing from the HN-I module 102 the transaction sequence, or transaction order.

When an endpoint, or endpoint module, 112 is a first type of endpoint, such as a peripheral endpoint, a common identifier, such as AXID, for the address range and the transactions sequence is serial.

When an endpoint 112 is of a second type, such as RAM module or RAM storage, or other memory module, an identifier, such as AXID ID, or AXID, which may include a hash, which is a value such that similar address transactions are kept in order and different address transactions are not sequence specific. Similar address transactions are transactions that are sequence specific and are desired to have the process order maintained. Different address transactions are transactions that are not sequence specific and the process order may be altered.

Interface 106 and HN-I SAM module 102, provide mapping functionality such that the mapping as described herein is target based, i.e., what is the target of request, such as which endpoint is the desired endpoint, or destination.

NIC module 108 is a network interface controller, such as a network interface card that permits connection for the subsystem 100. The NIC 108 is a component that provides networking capabilities for a computer. NIC module 108 may enable a wired connection (such as Ethernet) or a wireless connection (such as Wi-Fi) to a local area network. As shown in FIG. 1, the NIC 108 provides a connection between HN-I module 102 and endpoints 112 (generally).

Operatively coupled to NIC module 108, and providing a communication channel for NIC module 108 to endpoints 112(a) . . . (n), is bi-directional communicating busses 110(a) . . . (n) (where "n" is any suitable number that comports with an I/O system). The bus configuration including the number of busses and bus configuration may be varied. One embodiment is a dedicated bus, or associated bus, for each endpoint 112. Alternatively, more than one endpoint 112 may share a bus 110 or have multiple buses coupled to the endpoint 112.

As illustrated in FIG. 1, which is merely by way of example, endpoints 112(a) . . . (n) may include, for example, SRAM endpoint 112(a), operatively coupled to, and in bi-directional communication with, NIC module 108, via associated bi-directional bus 110(a). Peripheral endpoints 112(b) . . . (n) may include USB, GPIO, UART and other similar ports and/or devices and/or interface modules. The endpoints 112 (generally) are memory mapped. The illustration of a single SRAM endpoint 112(a) is merely to describe that the number and type of endpoints 112 could be any quantity and/or combination of endpoints, some being memory (SRAM, RAM, etc.) and others being peripheral endpoints (keyboards, printers, etc.) and yet others being ports (USB (universal Serial Bus) port, etc.)

Peripheral endpoint 112(b) is, for example, a peripheral device, or module, or other apparatus or node that is amenable to the subsystem 100. Peripheral endpoint 112(b) may be operatively coupled to, and in bi-directional communication with, NIC module 108, via bi-directional bus 110(b).

Peripheral endpoint 112(n) is, for example a peripheral device, or module, or other apparatus or node that is amenable to the subsystem 100. Peripheral endpoint 112(n) may be operatively coupled to, and in bi-directional communication with, NIC module 108, via bi-directional bus 110(n).

As will be apparent to those of ordinary skill in the art, it is an embodiment that any number and/or type of intervening modules, apparatus or nodes may be in communication with NIC module 108 and endpoints 112 (generally). These additional intervening nodes while not shown herein may be the result of a design choice or program parameter(s). The use or presence of intervening nodes, or modules, does not substantively affect the disclosure of the embodiments described herein.

Figure 2:
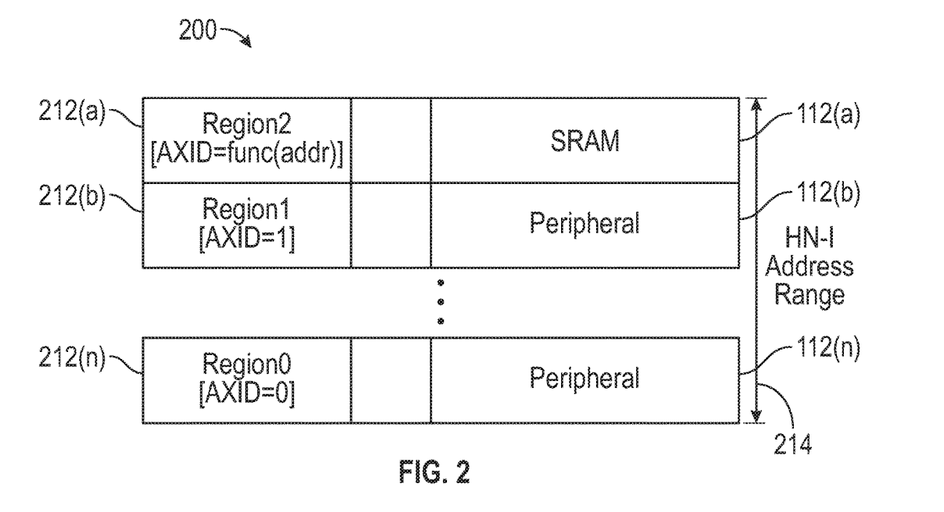
FIG. 2 illustrates an example block diagram of a Home-Node System Address Map (HN-I SAM), in accordance with various representative embodiments.

FIG. 2 illustrates an example block diagram 200 of a Home-Node System Address Map (HN-I SAM), in accordance with various representative embodiments.

As shown in FIG. 2, HN-I SAM (shown as 102 in FIG. 1) maps an incoming address to a target endpoint and the type of endpoint (peripheral v. RAM) that is connected downstream behind HN-I SAM.

HN-I SAM consists of configuration registers in which various address regions 212(a) . . . (n) (where "n" is any suitable number) can be programmed along with endpoint type 112(a) . . . (n) (where "n" is any suitable number) which exists in range 214.

For example, as seen in FIG. 2, there are two peripherals 112(b), 112(n) behind HN-I which takes in Region0 (212(n)) having AXID=1; and Region1 (212(b)) having AXID=0, respectively, while RAM 112(a) takes in REGION2 (212(a)).

Figure 3:
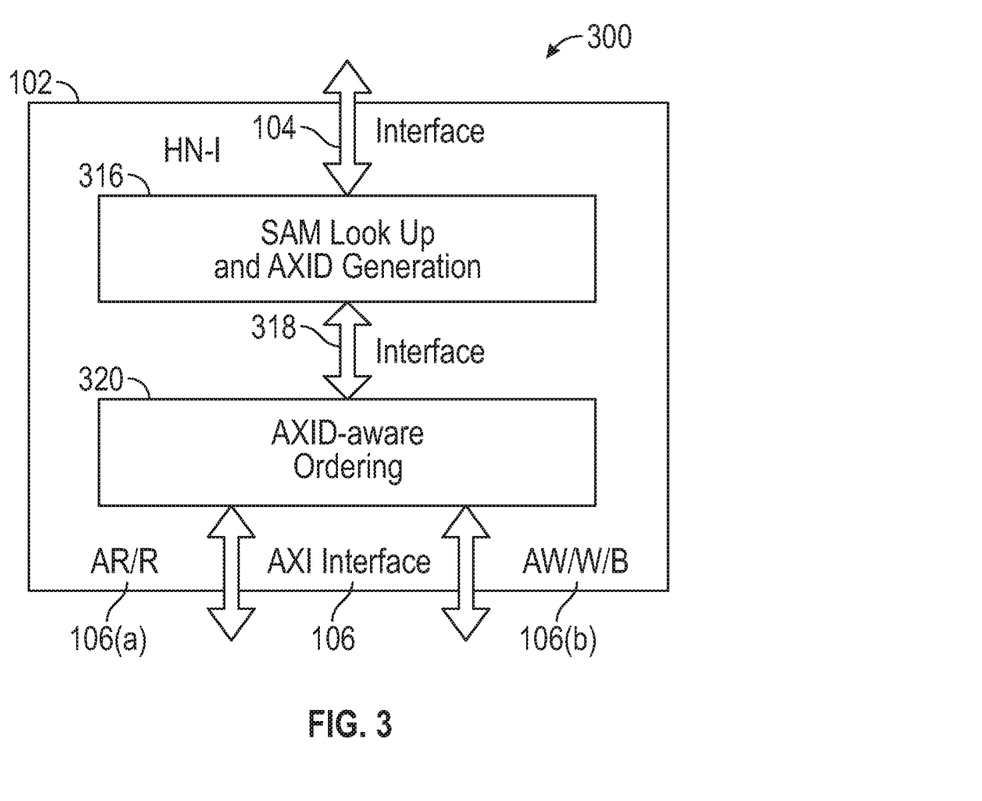
FIG. 3 shows an example Home-Node (HN-I) block diagram, in accordance with various representative embodiments.

FIG. 3 shows an illustration 300 that includes an example Home-Node (HN-I module) block diagram 102, in accordance with various representative embodiments. HN-I module 102 has an interface 104, such as a CHI interface, as described in relation to FIG. 1. Interface 104 is operatively coupled to a mapping module 316, which is coupled to interface 318 so as to communicate with an ordering module 320. Ordering module is coupled to interface 106, which may be an AXI interface, as described herein. The HN-I module 102 accesses and/or actuates ordering module, or unit, 320.

As shown in FIG. 3, an incoming transaction received via interface 104, such as a CHI interface, by mapping module 316. The mapping module 316 may be a module having a SAM look up and performs the AXID generation for the transaction. The identifier, AXID, is generated and provided to ordering module, or unit, 320, via interface 318, which may be an AXI interface.

Ordering module 320 may be a processor that has adequate storage and processing capability to perform ordering based on models, or rules, or algorithms, which may be stored in ordering module 320 or accessed from remote storage by ordering module 320. The order of processing transactions may or may not be sequential. Thus the processing of transactions according to the order may or may not be sequential.

As used herein the term "processor" may encompass or make use of programmable hardware such as: computers, microcontrollers, embedded microcontrollers, microprocessors, application-specific integrated circuits (ASICs), field-programmable gate arrays (FPGAs), and complex programmable logic devices (CPLDs). These hardware examples may further be used in combination to achieve a desired functional controller module. Computers, microcontrollers and microprocessors may be programmed using languages such as assembly, C, C++, C#, or the like. FPGAs, ASICs and CPLDs are often programmed using hardware description languages (HDL) such as VHSIC hardware description language (VHDL) or Verilog that configure connections between internal hardware modules with lesser functionality on a programmable device.

The ordering module 320 is shown as an AXID aware ordering unit. This AXID aware ordering unit 320 is agnostic to the type of endpoint (shown as 112, herein) being targeted and the AXID aware ordering unit 320 looks at AXID of read/write transactions for ordering purposes. The AXID for a given transaction is derived by looking up addresses through HN-I SAM and deriving the AXID from SAM. The ordering unit 320 is capable of storing instructions, code, algorithms, models and other operating and execution parameters.

For example, rules, or algorithms for AXID-aware ordering module 320 may be based on a model or parameter of:

1. Matching AXID transactions on same channel (RD-RD, WR-WR) will be serialized behind each other in a pipelined manner where a younger (later or second) transaction will be sent immediately after an older (previous or first) transaction is dispatched on a request channel (AR/AW);

2. Matching AXID transactions on different channels (RD-WR, WR-RD) will be serialized behind each other where the younger (later or second) transaction will wait for an older (previous or first) transaction to finish on response channel (R/B).

3. Unique AXID transactions have no ordering dependency relative to each other.

AXID generation is achieved when HN-I SAM gives out the information about which address-range (see, FIG. 2, element 214) a given address belongs to and the type of endpoint (peripheral or non-peripheral) which exists for that range. If the endpoint is a peripheral endpoint, HN-I module generates a given AXID that is the same for the entire address range (see, FIG. 2, element 214). This allows ordering unit (e.g., AXID-aware ordering unit) 320 to maintain transactions to a given peripheral in order since the transactions to the specified peripheral endpoint have the same AXID. For example, all of the transactions to a given peripheral endpoint have the same AXID.

Ordering unit 320 is operatively coupled to interface 106, which may be for example an AXI interface. AXI interface 106 has multiple components AR/R and AW/W/B, shown as 106(a), 106(b). While two interface components 106(a) and (b) are shown, any suitable number of interface components could be used. The interface 106 may be operatively coupled to other components, elements, devices, or nodes, such as an interface controller, interface card, bus, port or other connectable terminal.

Figure 4:
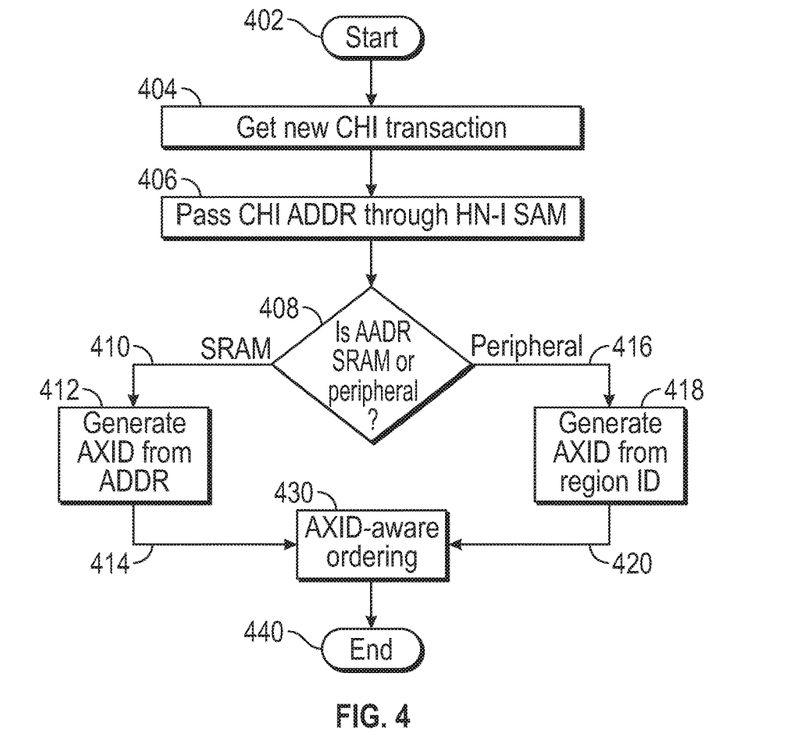
FIG. 4 shows an example flowchart that may be used for generating address ranges, in accordance with various representative embodiments.

FIG. 4 shows an example flowchart 400 that may be used for generating address ranges, in accordance with various representative embodiments. The series of operations 400 may be stored on non-volatile memory or other suitable memory or computer-usable medium and in any suitable programming language.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if desired, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wire line, optical fiber cable, RF, etc.

Computer program code for carrying out operations may be written in any combination of one or more programming languages, including an object-oriented programming language such as Java, Smalltalk, C++, C# or the like, and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

An embodiment is described below with reference to flowchart illustrations and/or block diagrams of methods, apparatus, systems and computer program products according to embodiments. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer, or other programmable data processing apparatus, create means for implementing the functions/acts specified in the flowchart and/or block diagram block or blocks. These computer program instructions may also be stored in a computer-readable medium that can direct a computer or other programmable data processing apparatus, to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational actions to be performed on the computer, or other programmable apparatus to produce a computer-implemented process such that the instructions which execute on the computer or other programmable apparatus, provide processes for implementing the functions/acts specified in the flowchart and/or block diagram block or blocks.

As shown in FIG. 4, the algorithm 400 begins (402). A transaction, such as a CHI transaction, is accessed (404). An address may be assigned to the transaction. The transaction address is passed through a mapping process, such as an HN-I SAM mapping process (406). A determination is made regarding the type of endpoint module, for example whether the transaction address is related to a memory endpoint (RAM, SRAM) or a peripheral endpoint (USB, device) (408).

When the determination (408) is made that the transaction address is related to a memory endpoint (410), an associated AXID is generated from the transaction address (412).

AXID-aware ordering is performed (430) for the AXID that has been generated (412).

When the determination (408) is made that the transaction address is related to a peripheral endpoint (416), an associated AXID is generated from the region identifier (418).

AXID-aware ordering is performed (430) for the AXID that has been generated by either the address (412), (414) or from the region identifier (418), (420). The AXID-aware ordering is then complete (440).

While FIG. 4 shows an example algorithm, another embodiment is directed to AXID generation achieved by HN-I SAM providing the information about which address-range a given address belongs to and the type of endpoint (peripheral or non-peripheral) which exists for that range. If the endpoint is a peripheral endpoint, HN-I generates a given AXID that is the same for the entre address range. This allows AXID-aware ordering unit to maintain transactions to a given peripheral in order since the transactions to that peripheral have the same AXID, which is specific to that peripheral. For example, all of the transactions to a given peripheral have the same AXID.

If the endpoint is a non-peripheral endpoint (e.g., RAM, SRAM) type, the HN-I generates an AXID that is a function of the address. A hash value is created from the address and the hash value is used as AXID. This allows AXID-aware ordering unit to keep the same address transactions in order since the same address transactions have the same AXID while different address transactions have no dependency since different address transactions have different AXIDs.

Figure 5:
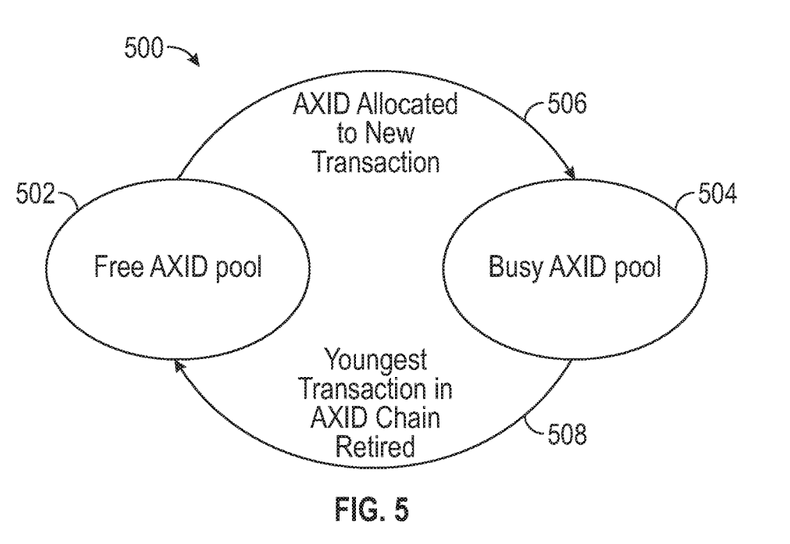
FIG. 5 shows an example of identification crossover, in accordance with various representative embodiments.

FIG. 5 shows a shows an example 500 of identification crossover, in accordance with various representative embodiments. This identification crossover utilizes free, available, AXID pool and busy, not available, AXID pool. FIG. 5 shows a free AXID pool 502 and busy AXID pool 504. An AXID identifier is allocated to a new transaction, as shown by 506, which may cause the address to be busy, or not available, (504). The youngest (newest, most recent) transaction in an AXID identifier chain is retired (508).

An AXID pooling method can be used to eliminate false AXID dependencies. For non-peripheral endpoints (e.g., RAM, SRAM), if the AXID is not wide enough, mapping address hash on AXID may result in false dependencies being created because of hash-aliasing issues. These hash-aliasing issues will be more pronounced if HN-I supports many in-flight transactions downstream. To alleviate these false dependencies the AXID pooling method is deployed in HN-I.

AXID pooling method includes two pools (502, 504) of AXIDs:

1. Free (available) AXID pool (502): This pool includes AXIDs that are currently not in use (available) for any in-flight transaction.
2. Busy (not available) AXID pool (504): This pool includes AXIDs that are currently in use (not available) for in-flight transactions.

After HN-I SAM look up, if the incoming transaction falls under non-peripheral (e.g., RAM, SRAM) endpoint space, the incoming address is compared against the addresses that are in-flight for non-peripheral endpoints (RAM) range. If an address match is detected, the incoming transaction inherits the AXID from the in-flight transaction with a matching address. If an address match is not detected, the incoming transaction gets its AXID from free (available) AXID pool (502) and that free AXID is moved into Busy AXID pool (504). This ensures that unique address transaction gets a unique AXID so that the AXID address does not have any false dependencies. Once all transactions for a given AXID have retired, that AXID is placed from Busy (unavailable) AXID pool (504) to Free (available) AXID pool (502).

Figure 6:
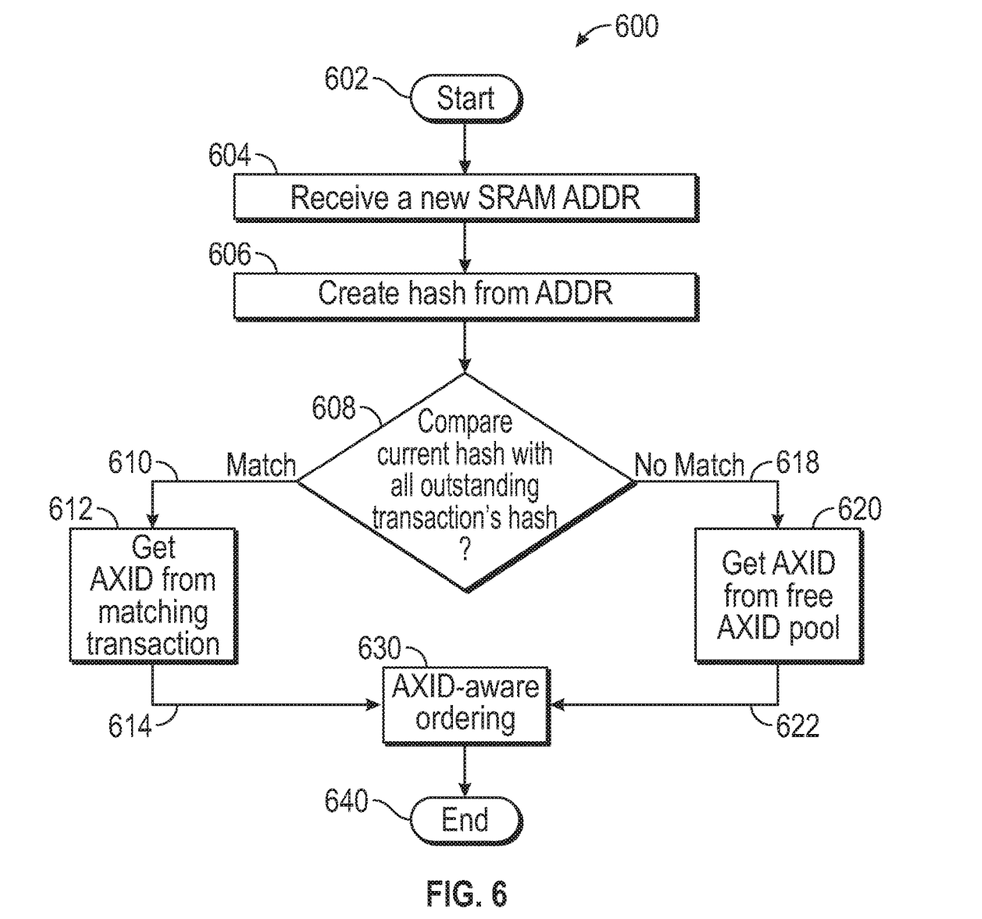
FIG. 6 shows an example flowchart that may be used for ordering using identification pooling, in accordance with various representative embodiments.

FIG. 6 shows an example flowchart 600, or algorithm, that may be used for ordering using identification pooling, in accordance with various representative embodiments. The algorithm, as shown in FIG. 6 may source code, object code, instructions stored on a computer-readable medium, or at a remote location, such as electronic storage server that can be accessed, as described in relation to FIG. 4 above.

The algorithm as shown in FIG. 6 begins (602). An address, such as a SRAM address is received (604), such as at a mapping module. A hash is created from the received address (606).

A comparison is made of a current hash with other outstanding transaction hash data (608).

When a match is determined with a current hash and a transaction's hash (610), an AXID is obtained from the matching transaction (612).

When it is determined that the current hash does not match any other transaction's hash (618), an AXID is accessed from an available (not used) AXID pool (620).

Once an AXID has been accessed, either as shown in 612, or 620, lines 614 and 622, respectively, show that AXID-aware ordering is performed (630). Following the AXID ordering, the algorithm ends (640).

In one embodiment, a 2-GHz Porter® (PORTER® is a registered trademark of ARM Inc.) interconnect with a 256-bit RN-F and a HN-I on neighboring XPs is examined. The HN-I has 16 request entries, 16 write data buffers and 32 tracker entries for reads dispatched to AXI. All traffic targets a single RAM on the downstream AXI bus with a 1 cycle delay.

Four traffic cases are considered: only reads, only writes, a read followed by a write, and "strides" which consist of reading from a ring buffer and a writes to a ring buffer that is evenly offset in a higher bit. From the first three cases, traffic addresses are either sequential or random.

In this baseline example case, traffic follows memory ordering rules based only on request type: reads or write.

TABLE 1

| Traffic: | Address: Random | Sequential | Strides |
| --- | --- | --- | --- |
| Read | 64 GB/s | 64 GB/s | — |
| Write | 64 GB/s | 64 GB/s | — |
| Read Then Write | 14.34 GB/s | 14.34 GB/s | — |
| Strides | — | — | 64 GB/s |

As seen in Table 1, there are traffic parameters of "Read", "Write", "Read Then Write" and "Strides". The address parameters may include "Random", "Sequential" and "Strides".

TABLE 2

| Traffic: | Address: Random | Sequential | Strides |
| --- | --- | --- | --- |
| Read | 64 GB/s | 64 GB/s | — |
| Write | 64 GB/s | 64 GB/s | — |
| Read Then Write | 106 GB/s | 128 GB/s | — |
| Strides | — | — | 99 GB/s |

As shown in Table 2, similar parameters that are shown in Table 1 are investigated. When the AXID pool is implemented using the low bits of the address above cache line size, there is increased performance, but most performance gain is typically when the addresses are sequential.

TABLE 3

| Traffic: | Address: Random | Sequential | Strides |
| --- | --- | --- | --- |
| Read | 64 GB/s | 64 GB/s | — |
| Write | 64 GB/s | 64 GB/s | — |
| Read Then Write | 128 GB/s | 128 GB/s | — |
| Strides | — | — | 128 GB/s |

As shown in Table 3, similar parameters that are shown in Table 1 and 2 are investigated. When the XOR hashing scheme is added, it is seen that traffic can hit maximum port bandwidth.

As will be appreciated by one skilled in the art, the disclosure may be embodied as a system, method or computer program product. Accordingly, the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the embodiments may take the form of a computer program product embodied in any tangible medium of expression having computer-usable program code embodied in the medium.

It can be seen that the system and methodologies presented herein provide an advancement in the state of the art.

Accordingly, some of the disclosed embodiments are set out in the following: A system, ("the System") comprising: a mapping module that is configured to access an incoming address and configured to map the incoming address to target one or more endpoints and a region type; an ordering module, operatively coupled to the mapping module, the ordering module configured to determine an order based on one or more transactions and address of the mapping module; a generation module operatively coupled to the ordering module configured to access, from the mapping module a type of target endpoint and, the generation module configured to access from the ordering module the order, the generation module configured to generate an identifier as a function of the target endpoint such that: when a target endpoint is a first type the generation module is configured to access a common identifier for the address range and the order is serial, when a target endpoint is a second type similar address transactions are processed according to the order and different address transactions are processed independent of the order.

The System described above, where the mapping module is configured to access a plurality of address regions in a predetermined range and a plurality of endpoint types in the predetermined range, that are stored in a memory, a priori.

The System described above, where when the target endpoint is a second type the mapping module is configured to generate the identifier as a function of the address, and is configured to create a hash value from the address and the hash value is used as the identifier.

The System described above, when a target endpoint is a second type the ordering module is configured to perform: a first categorization process that identifies one or more identifiers that are not currently assigned; and a second categorization process that identifies AXIDs that are currently assigned.

The System described above, where the ordering module is configured to compare an incoming address for a second target endpoint for a match to one or more endpoints, when a determination is made of a match, the incoming transaction is assigned an identifier from an in-flight transaction with the matching address; when a determination is made that there is not a match, the incoming transaction is assigned an identifier from available transactions, and the assigned identifier is defined as not available.

The System described above, where when transactions using assigned identifiers are complete, the assigned identifiers are designated as available.

The System described above, where the ordering module is configured to determine the order such that a second transaction will be sequenced after a first transaction on request channel.

The System as described above, where the ordering module is configured to determine the order such that transactions with matching identifiers on different channels are serialized such that second transaction waits until the first transaction is complete on a response channel.

The System as described above, where the ordering module is configured to determine that the identifiers are independent of the order.

A method ("the Method"), comprising: accessing an incoming address; mapping the incoming address to target one or more endpoints; determining an order based on one or more transactions and independent of the type of endpoint and address of the mapping module; accessing a type of target endpoint and the order; generating an identifier as a function of the target endpoint such that: when a target endpoint is a first type accessing a common identifier for the address range and the transactions order is serial, when a target endpoint is a second type similar address transactions are kept in sequence and different address transactions are independent of the order.

The Method as described above, further comprising: accessing a plurality of address regions in a predetermined range and a plurality of endpoint types in the predetermined range, that are stored a priori.

The Method as described above, further comprising: generating the identifier as a function of the address, where a hash value is created from the address and the hash value is used as the identifier.

The Method as described above, further comprising: identifying one or more identifiers that are not currently assigned; and identifying one or more identifiers that are currently assigned.

The Method as described above, further comprising: comparing an incoming address for a second target endpoint for a match to one or more endpoints; assigning the incoming transaction an identifier from an in-flight transaction with the matching address; assigning when a determination is made that there is not a match, the incoming transaction is assigned an identifier from available transactions, and the assigned identifier is defined as not available.

The Method as described above, further comprising: designating assigned identifiers as available when transactions using assigned identifiers are complete.

The Method as described above, further comprising: determining the order such that a second transaction will be sequenced after a first transaction on request channel.

The Method as described above, further comprising: determining the order such that transactions with matching identifiers on different channels are serialized such that second transaction waits until the first transaction is complete on a response channel.

The Method as described above, further comprising: determining that the identifiers are independent of the order.

An apparatus, comprising: a memory; and a processor, coupled to the memory, that executes instructions stored in the memory to: access an incoming address; map the incoming address to target one or more endpoints; determine an order based on one or more transactions and independent of the type of endpoint and the address; accessing a type of target endpoint and the order; generating an identifier as a function of the target endpoint such that: when a target endpoint is a first type accessing a common identifier for an address range and the order is serial, when a target endpoint is a second type similar address transactions are processed in sequence and different address transactions are processed independent of the order.

The various representative embodiments, which have been described in detail herein, have been presented by way of example and not by way of limitation. It will be understood by those skilled in the art that various changes may be made in the form and details of the described embodiments resulting in equivalent embodiments that remain within the claims.

The invention claimed is:

1. A system, comprising:
   a mapping module configured to access an incoming address and to map the incoming address to target one or more endpoints and a region type, each endpoint having a type;

an ordering module, operatively coupled to the mapping module, configured to determine an order based on one or more transactions and the incoming address; and a generation module, operatively coupled to the ordering module, configured to access, from the mapping module, a type of target endpoint, access, from the ordering module, the order, and generate an identifier as a function of the target endpoint, such that:

when a target endpoint is a first type, a common identifier is accessed for an address range and the order is serial, when a target endpoint is a second type, similar address transactions are processed according to the order and different address transactions are processed independent of the order.

2. The system as claimed in claim 1, where the mapping module is further configured to access a plurality of address regions in a predetermined range and a plurality of endpoint types in the predetermined range that are stored in a memory a priori.

3. The system as claimed in claim 1, where, when the target endpoint is the second type, the mapping module is further configured to generate the identifier as a function of the incoming address, such that a hash value is created from the incoming address and the hash value is used as the identifier.

4. The system as claimed in claim 1, where, when a target endpoint is the second type, the ordering module is further configured to perform:

a first categorization process that identifies one or more identifiers that are not currently assigned; and a second categorization process that identifies one or more identifiers that are currently assigned.

5. The system as claimed in claim 4, where the ordering module is further configured to compare an incoming address for a target endpoint for a match to one or more endpoints:

when a determination is made of a matching address, the transaction is assigned an identifier from an in-flight transaction with the matching address;

when a determination is made that there is not a matching address, the transaction is assigned an identifier from available transactions, and the assigned identifier is defined as not available.

6. The system as claimed in claim 5, where, when transactions using assigned identifiers are complete, the assigned identifiers are designated as available.

7. The system as claimed in claim 1, where the ordering module is further configured to determine a transaction order such that a second transaction will be sequenced after a first transaction on a request channel.

8. The system as claimed in claim 1, where the ordering module is further configured to determine a transaction order such that transactions with matching identifiers on different channels are serialized such that a second transaction waits until a first transaction is complete on a response channel.

9. The system as claimed in claim 1, where the ordering module is further configured to determine that the identifiers are independent of the order.

10. A method, comprising:
accessing an incoming address;
mapping the incoming address to target one or more endpoints, each endpoint having a type;
determining an order based on one or more transactions and independent of the type of endpoint and the incoming address;
accessing a type of target endpoint;
generating an identifier as a function of the target endpoint, such that:
when a target endpoint is a first type, a common identifier is accessed for an address range and the order is serial,
when a target endpoint is a second type similar address transactions are processed according to the order and different address transactions are processed independent of the order.

11. The method as claimed in claim 10, further comprising:
accessing a plurality of address regions in a predetermined range and a plurality of endpoint types in the predetermined range, that are stored a priori.

12. The method as claimed in claim 10, further comprising:
generating the identifier as a function of the incoming address, where a hash value is created from the incoming address and the hash value is used as the identifier.

13. The method as claimed in claim 10, further comprising:
identifying, by a first categorization, one or more identifiers that are not currently assigned; and
identifying, by a second categorization, one or more identifiers that are currently assigned.

14. The method as claimed in claim 13, further comprising:
comparing an incoming address for a target endpoint for a match to one or more endpoints;
assigning, when a determination is made that there is a matching address, the transaction an identifier from an in-flight transaction with the matching address; and
assigning, when a determination is made that there is not a matching address, the transaction an identifier from available transactions, and the assigned identifier is defined as not available.

15. The method as claimed in claim 14, further comprising:
designating one or more assigned identifiers as available when transactions using the one or more assigned identifiers are complete.

16. The method as claimed in claim 10, further comprising:
determining the order such that a second transaction will be sequenced after a first transaction on a request channel.

17. The method as claimed in claim 10, further comprising:
determining the order so transactions with matching identifiers on different channels are serialized such that one or more second transactions wait until one or more first transactions are complete on a response channel.

18. The method as claimed in claim 10, further comprising:
determining that the identifiers are independent of the order.

19. An apparatus, comprising:
a memory; and
a processor, coupled to the memory, that executes instructions stored in the memory to:
access an incoming address;
map the incoming address to target one or more endpoints, each endpoint having a type;
determine an order based on one or more transactions and independent of the type of endpoint and the incoming address;

access a type of target endpoint and the order; and
generate an identifier as a function of the target endpoint, such that:
- when a target endpoint is a first type, a common identifier is accessed for an associated address range and an associated transaction is processed according to the order, and
- when a target endpoint is a second type similar address transactions are processed according to the order and different address transactions are processed independent of the order.

* * * * *